United States Patent [19]

Mak et al.

[11] Patent Number: 4,587,647

[45] Date of Patent: May 6, 1986

[54] MEDIA SPINDLE CLAMP FOR DISK DRIVES UTILIZING REMOVABLE RECORDING MEDIA

[75] Inventors: David W. Mak, San Jose; Terry L. Branson, Cupertino, both of Calif.

[73] Assignee: Xerox Corporation, Stamford, Conn.

[21] Appl. No.: 470,108

[22] Filed: Feb. 28, 1983

[51] Int. Cl.⁴ .............................................. G11B 17/02
[52] U.S. Cl. ........................................ 369/270; 360/99
[58] Field of Search ............................ 369/270; 360/99

[56] References Cited

U.S. PATENT DOCUMENTS

| | | | |
|---|---|---|---|
| 3,706,085 | 12/1972 | Mowrey et al. | |
| 3,898,814 | 8/1975 | Chou et al. | 64/22 |
| 4,002,826 | 1/1977 | Iemenschot | 369/270 |
| 4,068,851 | 1/1978 | Yamamura | 369/270 |
| 4,218,065 | 8/1980 | van der Hoek | 274/9 |
| 4,320,833 | 3/1982 | Antoniotti et al. | 369/270 |
| 4,322,841 | 3/1982 | Borchard | 369/270 |
| 4,351,047 | 9/1982 | Redlich et al. | 369/270 |
| 4,358,843 | 11/1982 | Rager | 369/261 |
| 4,489,410 | 12/1984 | Yamaguch et al. | 369/270 |
| 4,502,136 | 2/1985 | Rickert et al. | 369/271 |

FOREIGN PATENT DOCUMENTS

| | | |
|---|---|---|
| 0026475 | 4/1981 | European Pat. Off. |
| 117688 | 9/1984 | European Pat. Off. |
| 2921410 | 12/1979 | Fed. Rep. of Germany. |
| 439395 | 12/1967 | Switzerland. |

Primary Examiner—Steven L. Stephan
Attorney, Agent, or Firm—Thomas M. Webster

[57] ABSTRACT

The spindle for a disk drive comprises a dish-like hub for centering a removable disk-like recording media and a magnet chuck for clamping the recording media against an axial position reference surface on the hub. To stably center the recording media on the spindle to provide a reference surface for controlling the axial positioning of the media, the hub has a central conical post which extends axially of the spindle beyond the plane of a radially displaced annular rim or flange. The post narrows toward its free outer end with a fixed taper, so that the recording media seats thereon and makes interference contact therewith before reaching the plane of the rim. To clamp the disk to the hub and to seat it against the rim, there is a magnetic chuck comprising an annular magnet which is disposed between the post and rim and a strike ring which is engaged with or embedded in an inner circumferential portion of the disk for deflecting the recording media into contract with the rim. For example, if the recording media is configured as a so-called "air sandwich" for what is known as "second surface" optical recording, the strike ring is advantageously embedded in the media while the air sandwich is being assembled.

5 Claims, 3 Drawing Figures

MEDIA SPINDLE CLAMP FOR DISK DRIVES UTILIZING REMOVABLE RECORDING MEDIA

BACKGROUND OF THE INVENTION

This invention relates to rotating memories and, more particularly, to improved means for centering removable recording media on and clamping it to the spindle of a disk drive.

Removable recording media has been successfully utilized in the magnetic rotating memory industry for many years. Indeed, media removability and transportability are generally recognized as being among the more significant advantages of so-called floppy and cartridge-type disk drives. Consequently, substantial effort and expense have been devoted to the development of self centering clamping mechanisms for securing removable recording media to the spindles of such disk drives. See, for example, Chou et al. U.S. Pat. No. 3,898,814, which issued Aug. 12, 1975 on a "Mechanism for Clamping and Driving a Flexible Disk."

The practical advantages of removable recording media are more or less the same for optical disk memories as for magnetic disk memories. However, the media centering spindle clamps that have been developed for magnetic memories are not suitable for optical memories, primarily because of the tighter tolerances on the axial positioning of the recording media in an optical memory and the unique structural characteristics of optical recording media.

A cylindrical spindle, such as employed on a conventional phonographic turntable, would allow the aforementioned axial tolerance requirements to be satisfied, but there would be unacceptable instability in the centering of the recording media because of the necessary clearance between the outside diameter of the spindle and the inside diameter of the disk-like recording media. A sliding or variable taper spindle also could be configured to be consistant with the axial tolerance requirements, but such a spindle would not stabilize the centering of the recording media. Moreover, neither a cylindrical spindle nor a sliding taper spindle would assist to any significant extent in counteracting the unwanted disk/spindle slippage which tends to occur while the spindle and disk are accelerating and if impact forces are applied to the drive during operation.

SUMMARY OF THE INVENTION

In accordance with the present invention, the spindle for a disk drive comprises a dishlike hub for centering a removable disk-like recording media and a magnet chuck for clamping the recording media against an axial position reference surface on the hub. To stably center the recording media on the spindle and to provide a reference surface for controllng the axial positioning of the media, the hub has a central conical post which extends axially of the spindle beyond the plane of a radially displaced annular rim or flange. The post narrows toward its free outer end with a fixed taper, so that the recording media seats thereon and makes interference contact therewith before reaching the plane of the rim. To clamp the disk to the hub and to seat it against the rim, there is a magnetic chuck comprising an annular magnet which is disposed between the post and rim and a strike ring which is engaged with or embedded in an inner circumferential portion of the disk for deflecting the recording media into contact with the rim. For example, if the recording media is configured as a so-called "air sandwich" for what is known as "second surface" optical recording, the strike ring is advantageously embedded in the media while the air sandwich is being assembled.

BRIEF DESCRIPTION OF THE DRAWINGS

Other features and advantages of this invention will become apparent when the following detailed description is read in conjunction with the attached drawings, in which.

DETAILED DESCRIPTION OF THE ILLUSTRATED EMBODIMENT

Figure 1:
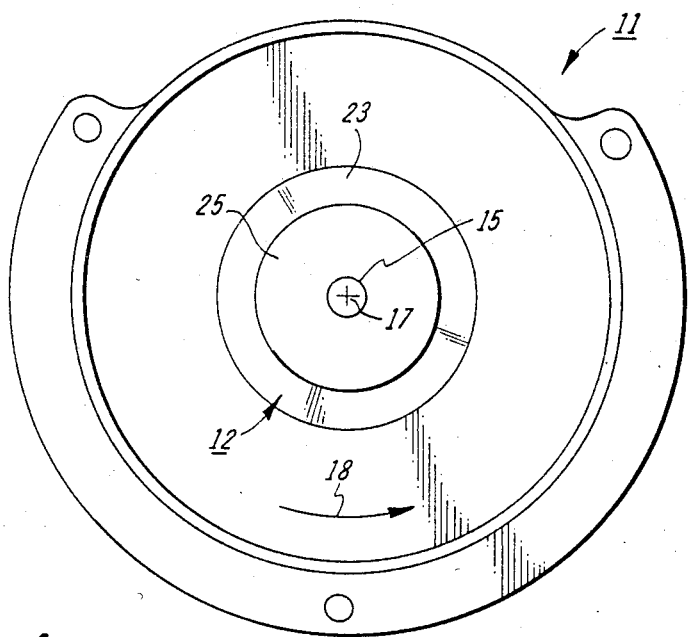
FIG. 1 is a simplified plan view of a spindle assembly for a disk drive.
Figure 2:
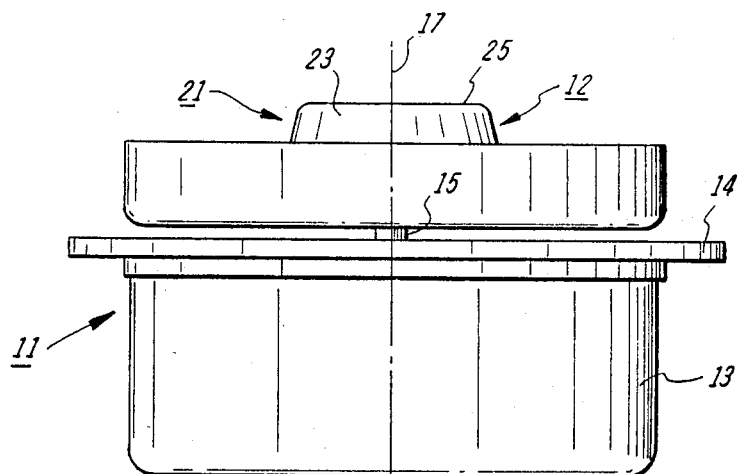
FIG. 2 is a simplified elevational view of the spindle assembly.

While the invention is described in some detail hereinbelow with reference to a single illustrated embodiment, it is to be understood that there is no intent to limit it to that embodiment. On the contrary, the aim is to cover all modifications, alternatives and equivalents of the invention as defined by the appended claims. Turning now to the drawings, and at this point especially to FIGS. 1 and 2, there is a spindle drive assembly 11 for, say, a horizontally mounted optical disk drive. As illustrated, the spindle assembly 11 comprises a spindle 12, which is supported (by means not shown) for rotation on the upper or top surface of a baseplate (also not shown), and a drive motor 13, which has its mounting flange 14 secured to the opposite side or bottom of the baseplate. Preferably, the motor 13 is a dc brushless motor which has its drive shaft 15 pinned or otherwise secured to the spindle 12, thereby providing a direct spindle drive.

In operation, a removeable disk-like recording media 16 (FIG. 3) is seated on and clamped to the spindle 12 for rotation about a central axis 17 in the direction of the arrow 18. Read and/or write beams (not shown) are focused on a preselected data track to retrieve data from or record data on the recording media 16. As a general rule, there are relatively tight tolerances on the axial and radial positioning of the media 16. Thus, relatively slight variations or changes in the axial position of the media 16 may cause defocusing of the incident read and/or write beams, while relatively slight changes in its radial position may cause troublesome off-track errors. Of course, there are tradeoffs involved in establishing the tolerances, but the tighter tolerances are indicated when the alternatives are considered. For example, data packing density (i.e., bits per inch and tracks per inch on the recording media 16) can be sacrificed to provide axial and radial tolerance relief, but a substantial reduction in the data packing density is required to obtain a slight reduction in those tolerances. Or, to relieve the axial tolerance requirements without sacrificing data packing density, the depth of focus of the beam focusing optics (not shown) might be increased, but that is a costly alternative which offers only limited relief.

Figure 3:
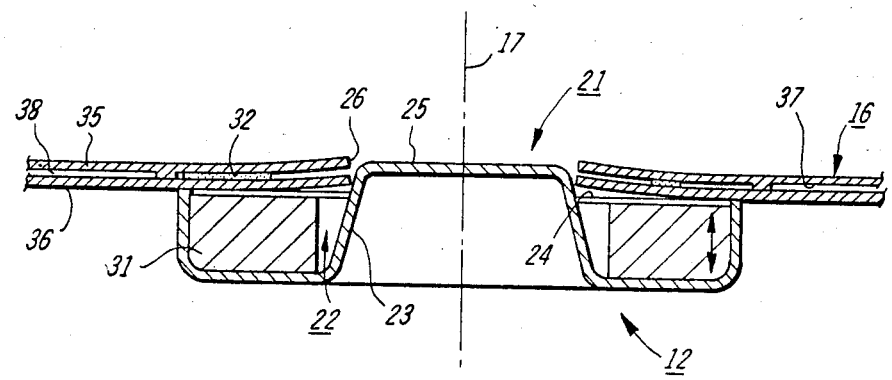
FIG. 3 is a fragmentary, axial sectional view of the disk/spindle interface which this invention provides for the spindle assembly.

In accordance with the present invention, as best shown in FIG. 3, the spindle 12 comprises a dish-like hub 21 and a magnetic chuck 22 for precisely controlling the axial and radial positioning of the recording media 16. More particularly, the hub 21 is suitably formed from steel stock, such as by stamping, to have an elongated, axially extending, conical center post 23 and a annular flange or rim 24. The rim 24 is radially displaced from the center post 23 and lies in a plane which is orthogonal to the axis of rotation 17 of the spindle 12 and axially displaced from the outer or free end 25 of the post 23. The center post 23, on the other hand, has a fixed taper so that it gradually narrows towards its free end 25 to an outside diameter which is somewhat less than the inside diameter of the recording media or disk 16, as defined by its central mounting aperture 26. Thus, there is adequate clearance between the periphery of the disk mounting aperture 26 and the outside diameter of the outermost end 25 of the center post 23 to cause the media 16 to settle down upon the center post 23. As will be appreciated, the taper of the center post 23 provides a camming action for centering the media 16 as it settles. Moreover, in keeping with an important feature of this invention, there is interference contact, as at 27, between the inside diameter of the media 16 and the outside diameter of the center post 23 above or outwardly from the plane of the annular rim 24. This interference fit stabilizes the centering or radial positioning of the media 16.

To stabilize the axial positioning of the recording media or disk 16 and to prevent unwanted disk/spindle slippage, the media 16 is clamped to the hub 21 by the magnetic chuck 22. To that end, the magnetic chuck 22 includes an annular magnet 31, which is supported on the hub 21 between the center post 23 and the rim 24 just beneath the plane of the rim 24, and a strike ring 32, which is engaged with or embedded in an inner circumferential section of the media 16 at a short radial distance from the disk mounting aperture 26. To carry out this invention, strike ring 32 overlies the magnet 31, whereby the axial magnetic attractive force acting on the strike ring 32 causes the innermost portion of the media 16 to axially deflect so that the media 16 seats against the rim 24. Preferably, the magnetic 31 is a permanent magnet. The strike ring 32, on the other hand, is fabricated from a ferrous metal.

As shown, the recording media 16 is in a so-called "air sandwich" configuration for what is known as "second surface" optical recording. Thus, there are a disk-like substrate 35 and cover 36 which are sealed to enclose an optically sensitive recording surface 37. The recording surface 37 is carried by the substrate 35 and is separated by a narrow cap 38 from the cover 36. Alternatively, the cover 36 might be replaced by a substrate having another interior optically sensitive recording surface. In either case, the strike ring 32 may be easily embedded in such a recording media while the air sandwich is being assembled.

As will be appreciated, there are a number of factors involved in configuring the hub 21 and the magnetic chuck 22 for a practical application of this invention. One of the more important factors is the stiffness of the recording media 16. Consequently, in the interest of completeness, it is noted that the substrate 35 and cover 36 of the illustrated recording media 16 typically are 1.2-1.5 mm thick polymethylmethacrylate (PMMA) moldings. Other important factors are the nominal inside diameter of the recording media 16 and the radial distance to the inner most data track thereon. As will be seen, the recording media 16 must be firmly seated on and axially referenced to the rim 24 inwardly of that inner most data track.

CONCLUSION

In view of the foregoing, it will now be understood that the present invention provides a relatively simple and reliable means for precisely centering removable recording media on and clamping it to a disk drive spindle.

What is claimed is:

1. In a disk drive utilizing removable recording media having a predetermined nominal inside diameter defined by a central mounting aperture, an improved spindle for supporting said recording media for rotation about a predetermined axis; said spindle comprising a single piece hub having an elongated, axially extending, conical center post and a rim, said rim being radially displaced from said center post and substantially lying in a plane orthogonal to said axis, said center post having a free end with a relatively narrow diameter to fit through the mounting aperture of said media and being tapered to make radial interference contact with the inside diameter of said recording media in a plane which is essentially parallel to but axially displaced in a predetermined direction from the plane of said rim; and a radially displaced chuck located between said center post and said rim for supplying axial force to deflect said media axially into seated engagement with said rim.

2. The improved spindle of claim 1 wherein said rim is annular to provide a continuous axial position reference surface for said recording media, and said chuck is an annular magnetic chuck for supplying substantially uniform axial forces circumferentially of said recording media to seat said recording media against said rim.

3. The improved spindle of claim 2 wherein said magnetic chuck comprises an annular permanent magnet supported on said hub in axially displaced relationship with respect to the plane of said rim, said magnet being displaced from the plane of said rim in a direction opposite to said predetermined direction, and a strike ring overlying said magnet in engagement with said recording media.

4. The improved spindle of claim 3 wherein said strike ring is embedded in said recording media.

5. The improved spindle of claim 4 wherein said recording media comprises a pair of members which are sealed together and separated by a narrow gap, and said strike ring is sandwiched between said members.

* * * * *